United States Patent
Colglazier (10) Patent No.: US 10,853,267 B2
(45) Date of Patent: Dec. 1, 2020

(54) ADAPTIVE METHOD FOR SELECTING A CACHE LINE REPLACEMENT ALGORITHM IN A DIRECT-MAPPED CACHE

(71) Applicant: Lenovo Enterprise Solutions (Singapore) Pte. Ltd., Singapore (SG)

(72) Inventor: Daniel J. Colglazier, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 238 days.

(21) Appl. No.: 15/181,668

(22) Filed: Jun. 14, 2016

(65) Prior Publication Data
US 2017/0357598 A1 Dec. 14, 2017

(51) Int. Cl.
*G06F 12/122* (2016.01)
*G06F 12/0811* (2016.01)
*G06F 12/128* (2016.01)

(52) U.S. Cl.
CPC ........ *G06F 12/122* (2013.01); *G06F 12/0811* (2013.01); *G06F 12/128* (2013.01); *G06F 2212/1041* (2013.01); *G06F 2212/283* (2013.01)

(58) Field of Classification Search
CPC ............... G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–787; G06F 17/00–40; G06F 21/00–88; G06F 2003/0691–0698; G06F 2009/3883; G06F 2009/45562–45595;
(Continued)

(56) References Cited

U.S. PATENT DOCUMENTS

| | | | | |
|---|---|---|---|---|
| 4,962,451 A | * | 10/1990 | Case | ........................ G06F 7/24 |
| 5,465,342 A | * | 11/1995 | Walsh | ................ G06F 12/0864 |
| | | | | 711/119 |

(Continued)

OTHER PUBLICATIONS

G. Santhanakrishnan, A. Amer and P. K. Chrysanthis, "A goal-oriented self-tuning caching algorithm," IEEE International Conference on Performance, Computing, and Communications, 2004, Phoenix, AZ, USA, 2004, pp. 311-312 (Year: 2004).*

(Continued)

*Primary Examiner* — Daniel C. Chappell
(74) *Attorney, Agent, or Firm* — Jeffrey Streets (57) ABSTRACT

A method of managing a direct-mapped cache is provided. The method includes a direct-mapped cache receiving memory references indexed to a particular cache line, using a first cache line replacement algorithm to select a main memory block as a candidate for storage in the cache line in response to each memory reference, and using a second cache line replacement algorithm to select a main memory block as a candidate for storage in the cache line in response to each memory reference. The method further includes identifying, over a plurality of most recently received memory references, which one of the algorithms has selected a main memory block that matches a next memory reference a greater number of times, and storing a block of main memory in the cache line, wherein the block of main memory stored in the cache line is the main memory block selected by the identified algorithm.

20 Claims, 5 Drawing Sheets

(58) Field of Classification Search
CPC ...... G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | |
|---|---|---|---|---|
| 5,551,001 | A * | 8/1996 | Cohen | G06F 12/0848 711/122 |
| 6,223,255 | B1 * | 4/2001 | Argade | G06F 9/3001 711/120 |
| 6,493,721 | B1 * | 12/2002 | Getchius | G06Q 30/02 |
| 6,889,291 | B1 * | 5/2005 | Palanca | G06F 12/0848 711/118 |
| 8,607,001 | B2 * | 12/2013 | Zhao | H04L 67/2852 711/134 |
| 8,924,647 | B1 * | 12/2014 | Evans | G06F 12/127 711/122 |
| 8,965,819 | B2 * | 2/2015 | Tirunagari | G06F 12/121 706/15 |
| 9,003,126 | B2 * | 4/2015 | Cai | G06F 12/126 711/133 |
| 9,047,225 | B1 * | 6/2015 | Evans | G06F 12/121 |
| 9,514,053 | B2 * | 12/2016 | Kass | G06F 12/0875 |
| 10,216,632 | B2 * | 2/2019 | Kass | G06F 12/0815 |
| 10,387,330 | B1 * | 8/2019 | Colglazier | G06F 12/123 |
| 10,430,188 | B2 * | 10/2019 | Jacobi | G06F 12/123 |
| 10,430,349 | B2 * | 10/2019 | Moyer | G06F 12/122 |
| 2011/0072214 | A1 * | 3/2011 | Li | G06F 12/0848 711/124 |
| 2012/0041914 | A1 * | 2/2012 | Tirunagari | G06F 12/121 706/15 |
| 2012/0079206 | A1 * | 3/2012 | Zhao | H04L 67/2852 711/134 |
| 2013/0007373 | A1 * | 1/2013 | Beckmann | G06F 12/126 711/136 |
| 2013/0219125 | A1 * | 8/2013 | Kusters | G06F 12/0871 711/136 |
| 2015/0229734 | A1 * | 8/2015 | Kim | H04L 43/0876 709/213 |
| 2017/0357596 | A1 * | 12/2017 | Moyer | G06F 12/0897 |

OTHER PUBLICATIONS

S. Du, C. Li, X. Mao and W. Yan, "The Optimization of LRU Algorithm Based on Pre-Selection and Cache Prefetching of Files in Hybrid Cloud," 2016 17th International Conference on Parallel and Distributed Computing, Applications and Technologies (PDCAT), Guangzhou, 2016, pp. 125-132 (Year: 2016).*

A. Asaduzzaman, "An efficient memory block selection strategy to improve the performance of cache memory subsystem," 14th International Conference on Computer and Information Technology (ICCIT 2011), Dhaka, 2011, pp. 12-17 (Year: 2011).*

Qureshi et al., "Adaptive Insertion Policies for High Performance Caching", ISCA '07, SanDiego, California, ACM 978-1-59593-706-3/07/0006, Jun. 9-13, 2007, 11 pages.

Wikipedia, "Adaptive replacement cache", https://en.wikipedia.org/wiki/Adaptive_replacement_cache, Apr. 19, 2016, 3 pages.

* cited by examiner

ADAPTIVE METHOD FOR SELECTING A CACHE LINE REPLACEMENT ALGORITHM IN A DIRECT-MAPPED CACHE

BACKGROUND

Field of the Invention

The present invention relates to replacement policies and methods of using direct-mapped caches.

Background of the Related Art

Computers continue to get faster and more efficient to meet a heavy demand for processing many different types of tasks. Cache memory makes a limited amount of data rapidly accessible to a processor. To facilitate the access, the cache memory may be physically closer to the processor than main memory. In fact, a processor (CPU) cache (or L1 cache) may be physically located on the same chip as the processor and may be dedicated to a single processor core on a multi-core chip.

Data is transferred between main memory and cache in blocks of fixed size, called cache lines. When a cache line is copied from memory into the cache, a cache entry is created. The cache entry will include the copied data as well as the requested memory location.

When the processor needs to read or write a location in main memory, the processor first checks for a corresponding entry in the cache. The cache checks for the contents of the requested memory location in any cache lines that might contain that address. If the processor finds that the memory location is in the cache, a cache hit has occurred. However, if the processor does not find the memory location in the cache, a cache miss has occurred. In the case of a cache hit, the processor immediately reads or writes the data in the cache line. For a cache miss, the cache allocates a new entry and copies in the requested data from main memory, then the request is fulfilled from the contents of the cache. The proportion of accesses that result in a cache hit is known as the hit rate, and can be a measure of the effectiveness of the cache for a given program or algorithm.

Read misses delay processor execution because the processor must wait for the requested data to be transferred from memory, which is much slower than reading from the cache. Write misses may occur without such delay, since the processor can continue execution while data is copied to main memory in the background.

In order to make room for the new entry on a cache miss, the cache may have to evict one of the existing entries. The heuristic that is used to choose the entry to evict and the conditions of the eviction is called the replacement policy. The fundamental problem with any replacement policy is that it must predict what data will be requested in the future.

Figure 1:
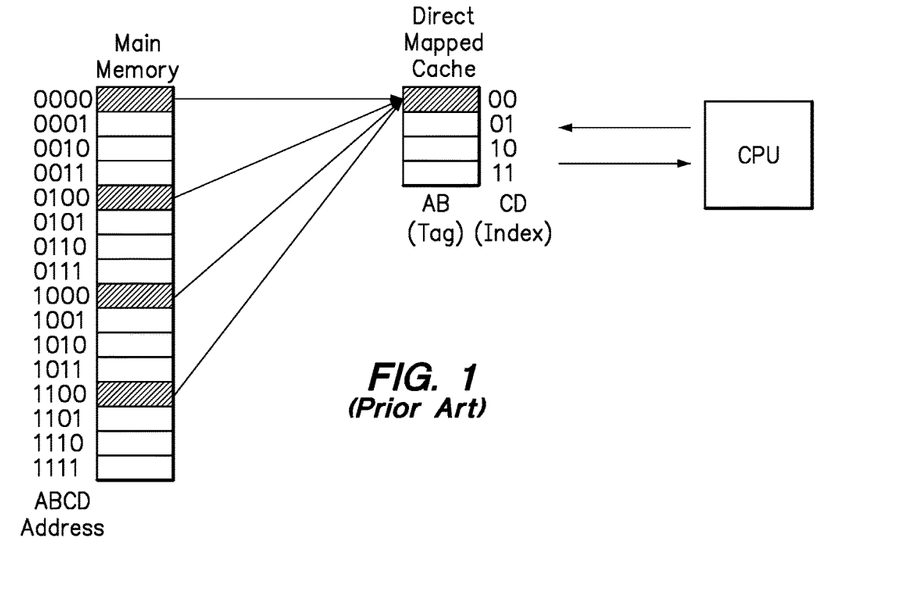
FIG. 1 is a diagram illustrating the use of a direct-mapped cache.

FIG. 1 is a diagram illustrating the use of a direct-mapped cache. Each main memory block can be mapped to only one location in a direct-mapped cache. This mapping limitation has the advantage of making it quick and easy to determine whether a cache hit has occurred. The disadvantage is that two or more active main memory segments or blocks may map to the same direct-mapped cache entry which will produce a low cache hit rate and lower performance.

Furthermore, a portion of the main memory address is used to directly map to a cache entry. In this example, a main memory address has four bits labeled A, B, C and D, wherein bits C and D (serving as an index) are used to determine the proper cache entry or line. The other main memory address bits A and B (serving as a tag) are stored in the cache directory so that it is known which main memory block is stored in the cache line. When a main memory block is referenced, the cache is checked to see if it holds that block. This is done by using address bits C and D to determine which cache line to check and by using address bits A and B to see if they match what is stored in the directory. If they match, then this is a cache hit and the memory reference can be satisfied by the cache line which is faster than accessing main memory. Accordingly, a CPU may read from, or write to, the referenced memory block in the cache line. If the memory reference is mapped to a line that does not have a matching tag (bits A and B), then the request must be fulfilled by the slower main memory. When a cache miss occurs in a conventional direct-mapped cache, the current cache entry is replaced by the requested main memory block.

Figure 2:
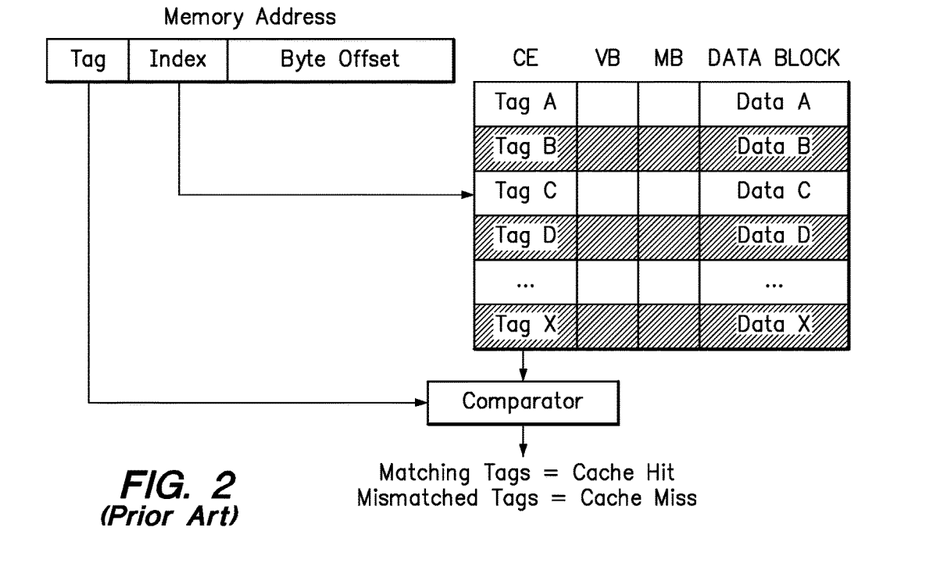
FIG. 2 is a diagram of a conventional direct-mapped cache distinguishing between a cache hit and a cache miss.

FIG. 2 is a diagram of a conventional direct-mapped cache illustrating how a direct-mapped cache is organized, and how the cache functions to distinguish between a cache hit and a cache miss. Each memory address may be considered to have three parts. The lowest address bits are called the byte offset. Since caches work with cache lines that are typically 64 or 128 bytes, there is no need to address anything smaller than the cache line. Therefore, the address bits used to select a particular byte in a cache line are not used in the cache itself.

The next portion of the memory address is the Index. The address bits of the index are used to determine the particular cache line being addressed. The rest of the memory address is referred to as the tag. The address bits of the tag are stored in the cache directory and used to keep track of the address of the block that is stored in a cache line. A comparator is used to compare the tag of the memory address to the one stored in the cache directory to determine whether there is a cache hit or miss.

Along with the tag, each entry or line of the cache directory may have three more fields. The valid bit (VB) indicates whether or not the line is valid or not. An invalid line always produces a cache miss. The modified bit (MB) indicates whether or not this entry has been modified and may differ from main memory. If an entry has been modified, it will need to be written back to main memory before it is replaced. Some caching algorithms do not allow modified entries, so this field is not present in all direct-mapped cache implementations. The final field is the data which is a cache line portion of main memory. The purpose of the cache is to hold frequently used portions of main memory so that the processor can access it faster than it could from main memory.

In a direct-mapped cache, each cache line in memory can map into only one location in the cache. A typical replacement algorithm is simple, namely causing the most recent memory reference that maps into a cache location to be the one stored in that cache location. This works well with most workloads that will reference this memory location multiple times before it is replaced in the cache resulting in multiple cache hits. Unfortunately, not all workloads have a reference pattern that will produce a lot of cache hits in a direct-mapped cache using this replacement algorithm. While an alternative replacement algorithm could be implemented for use in a direct-mapped cache, any improvement in the cache hit rate when running a first workload is expected to be at least partially offset by a reduction in the cache hit rate when running a second workload.

BRIEF SUMMARY

One embodiment of the present invention provides a method comprising a direct-mapped cache receiving a series of memory references indexed to a cache line of the direct-mapped cache, using a first cache line replacement algorithm to select a main memory block as a candidate for storage in the cache line of the direct-mapped cache in response to each memory reference, and using a second cache line replacement algorithm to select a main memory block as a candidate for storage in the cache line of the direct-mapped cache in response to each memory reference. The method further comprises identifying, over a plurality of most recently received memory references, which one of the first and second cache line replacement algorithms has selected a main memory block that matches a next memory reference a greater number of times, and storing a block of main memory in the cache line, wherein the block of main memory stored in the cache line is the main memory block selected by the identified cache line replacement algorithm.

Another embodiment of the present invention provides a computer program product for managing a direct-mapped cache, the computer program product comprising a computer readable storage medium having non-transitory program instructions embodied therewith, wherein the non-transitory program instructions are executable by a processor to cause the processor to perform a method. The method comprises a direct-mapped cache receiving a series of memory references indexed to a cache line of the direct-mapped cache, using a first cache line replacement algorithm to select a main memory block as a candidate for storage in the cache line of the direct-mapped cache in response to each memory reference, and using a second cache line replacement algorithm to select a main memory block as a candidate for storage in the cache line of the direct-mapped cache in response to each memory reference. The method further comprises identifying, over a plurality of most recently received memory references, which one of the first and second cache line replacement algorithms has selected a main memory block that matches a next memory reference a greater number of times, and storing a block of main memory in the cache line, wherein the block of main memory stored in the cache line is the main memory block selected by the identified cache line replacement algorithm.

DETAILED DESCRIPTION

One embodiment of the present invention provides a method comprising a direct-mapped cache receiving a series of memory references indexed to a cache line of the direct-mapped cache, using a first cache line replacement algorithm to select a main memory block as a candidate for storage in the cache line of the direct-mapped cache in response to each memory reference, and using a second cache line replacement algorithm to select a main memory block as a candidate for storage in the cache line of the direct-mapped cache in response to each memory reference. The method further comprises identifying, over a plurality of most recently received memory references, which one of the first and second cache line replacement algorithms has selected a main memory block that matches a next memory reference a greater number of times, and storing a block of main memory in the cache line, wherein the block of main memory stored in the cache line is the main memory block selected by the identified cache line replacement algorithm.

Each memory reference may be received with an instruction, such as a read or write instruction. Accordingly, it is possible to read or write data to or from a specific portion of memory that is identified by the memory reference. A memory reference (address) may be divisible into a tag, index and byte offset. In a direct-mapped cache, the index is mapped to a particular cache line and the tag identifies one of a plurality of main memory blocks that are mapped to the cache line. Accordingly, for any given cache line of the direct-mapped cache, the tag is representative of a given main memory block. If the memory reference has a tag that matches the tag associated with the main memory block that is stored in the cache line, then there is a "cache hit". If the memory reference has a tag that does not match the tag associated with the main memory block that is stored in the cache line, then there is a "cache miss".

In response to receiving each memory reference, embodiments of the present invention use a first cache line replacement algorithm to select a main memory block as a candidate for storage in the cache line and a second cache line replacement algorithm to select a main memory block as a candidate for storage in the cache line. The first and second cache line replacement algorithms may select the same main memory block or different main memory blocks as candidates for storage in the cache line. However, at any particular point in time, only one of the first and second cache line replacement algorithms will be "active" in the sense that only the candidate main memory block selected by the identified ("active") cache line replacement algorithm will be stored in the cache line.

Over a plurality of most recently received memory references, the method identifies which one of the first and second cache line replacement algorithms has selected a main memory block that matches a next memory reference a greater number of times. The memory reference may be compared to the candidate main memory blocks selected by both the first and second cache line replacement algorithms. The comparison may result in a "match" or "does not match" determination. It should be appreciated that a "match" does not imply a "cache hit", since a memory reference can match a candidate main memory block selected by a cache line replacement algorithm that is not the identified ("active") cache line replacement algorithm. Methods of the present invention determine whether each memory reference matches the candidate main memory blocks selected by both the first and second algorithms for the purpose of identifying one of the first and second cache line replacement algorithms that is resulting in a greater number of matches over a plurality of most recently received memory references. By dynamically switching between cache line replacement algorithms, it is possible to control the main memory block that is stored in the cache line using the one of the first and second cache line replacement algorithms that is generating the most recent matches, such that the "cache hit rate" is increased. Since any cache line replacement algorithm may be optimal with only certain types of processes or applications, the present methods may automatically switch back and forth between first and second cache line replacement algorithms to obtain a higher cache hit rate than either algorithm might achieve on its own.

In another embodiment, the method further includes storing a first tag in a first current entry field of the cache line, wherein the first tag identifies the block of main memory selected by the first cache line replacement algorithm in response to the most recently received memory reference, and storing a second tag in a second current entry field of the cache line, wherein the second tag identifies the block of main memory selected by the second cache line replacement algorithm in response to the most recently received memory reference. Accordingly, both the first and second current entry fields are updated after receiving each memory reference that is mapped to the cache line. As previously discussed, in a direct-mapped cache, the tag is sufficient to identify a particular main memory block. While the first and second current entry fields each store a tag associated with the first and second cache line replacement algorithm, respectively, only the tag stored in the current entry field associated with the identified ("active") cache line replacement algorithm will identify the main memory block that is actually stored in the cache line.

The method may further include determining whether the next memory reference received has a tag that matches the tag stored in the first current entry field of the cache line, and determining whether the next memory reference received has a tag that matches the tag stored in the second current entry field of the cache line. As described herein, whether the memory reference tag matches the tag in the first current entry field, the tag in the second current entry field, neither tag or both tags, effects how embodiments of the present invention determine which cache line replacement algorithm is the identified (active) cache line replacement algorithm that controls the selection of the main memory block stored in the cache line.

In various embodiments, the method may include storing a value, such as a binary value, in a replacement algorithm bit field in the cache line to indicate the identified cache line replacement algorithm. For example, a first value stored in the replacement algorithm bit field may indicate that the first cache line replacement algorithm is currently being used to select the main memory block stored in the cache line, and a second value stored in the replacement algorithm bit field may indicate that the second cache line replacement algorithm is currently being used to select the main memory block stored in the cache line. Optionally, the first value may be a logical "0" and the second value may be a logical "1", although it should be recognized that any two values may be used, including the opposite of the foregoing two values, so long as the values are used consistently to indicate which of the cache line replacement algorithms is the identified (active) cache line replacement algorithm.

In further embodiments, the method may include storing a value, such as a binary value, in a replacement algorithm count field of the cache line of the direct-mapped cache to indicate, over the plurality of most recently received memory references, a number of times that the identified cache line replacement algorithm has selected a main memory block that matches a next memory reference and the cache line replacement algorithm that is not the identified cache line replacement algorithm has selected a main memory block that does not match the next memory reference, less a number of times that the cache line replacement algorithm that is not the identified cache line replacement algorithm has selected a main memory block that matches a next memory reference and the identified cache line replacement algorithm has selected a main memory block that does not match the next memory reference. For example, a first value (such as a logical "0") stored in the replacement algorithm count field may indicate that the cache line replacement algorithm that is not currently the identified cache line replacement algorithm will become the identified cache line replacement algorithm in response to a next received memory reference matching the main memory block selected by the cache line replacement algorithm that is not currently the identified cache line replacement algorithm and not matching the main memory block selected by the identified cache line replacement algorithm. A next received memory reference may be considered to match a main memory block if the next received memory reference has a tag that matches a tag associated with the main memory block.

Optionally, the method may further include switching the one of the first and second cache line replacement algorithms that is currently the identified (active) cache line replacement algorithm in response to a next received memory reference matching the main memory block selected by the cache line replacement algorithm that is not currently the identified cache line replacement algorithm and not matching the main memory block selected by the identified cache line replacement algorithm when the replacement algorithm count field stores the first value. Switching the one of the first and second cache line replacement algorithms that is currently the identified cache line replacement algorithm may include changing the value stored in the replacement algorithm bit field.

In a further embodiment, a second value (such as a logical "1") stored in the replacement algorithm count field may indicate that the second value will be changed to the first value in response to the next received memory reference matching the main memory block selected by the cache line replacement algorithm that is not currently the identified cache line replacement algorithm and not matching the main memory block selected by the identified cache line replacement algorithm. Still further, the method may change the replacement algorithm count bit from the second value to the first value in response to the next received memory reference matching the main memory block selected by the cache line replacement algorithm that is not currently the identified cache line replacement algorithm and not matching the main memory block selected by the identified cache line replacement algorithm. Conversely, the method may change the replacement algorithm count bit from the first value to the second value in response to the next received memory reference matching the main memory block selected by the identified cache line replacement algorithm and not matching the main memory block selected by the cache line replacement algorithm that is not currently the identified cache line replacement algorithm.

Furthermore, the method may maintain the values stored in the replacement algorithm bit field and the replacement algorithm count field in response to determining that the most recently received memory reference matches the main memory block selected by the identified cache line replacement algorithm and matches the main memory block selected by the cache line replacement algorithm that is not currently the identified cache line replacement algorithm. Similarly, the method may maintain the values stored in the replacement algorithm bit field and the replacement algorithm count field in response to determining that the most recently received memory reference does not match the main memory block selected by the identified cache line replacement algorithm and does not match the main memory block selected by the cache line replacement algorithm that is not currently the identified cache line replacement algorithm. According to the foregoing, the replacement algorithm count field doesn't change unless the memory reference matches the main memory block (or tag) selected by one algorithm and does not match the main memory block (or tag) selected by the other algorithm. When both algorithms result in a match or both algorithms do not result in a match, then the replacement algorithm count field is not changed.

In the various embodiments of the present invention, the method may include performing a read operation on the main memory block stored in the cache line in response to the direct-mapped cache receiving a read instruction with a memory reference having a tag that matches the tag stored in the current entry field of the identified (active) cache line replacement algorithm. Similarly, the method may include performing a write operation on the main memory block stored in the cache line in response to the direct-mapped cache receiving a write instruction with a memory reference having a tag that matches the tag stored in the current entry field of the identified cache line replacement algorithm.

It should be recognized that the first and second cache line replacement algorithms may be any two cache line replacement algorithms now existing or developed in the future. For example, a first cache line replacement algorithm may be a conventional cache line replacement algorithm as described in reference FIGS. 1 and 2, above, and a second cache line replacement algorithm may be the cache line replacement algorithm described in copending U.S. patent application Ser. No. 15/086,989 filed on Mar. 31, 2016, which application is incorporated by reference herein. Accordingly, either of the first and second cache line replacement algorithms may, as part of the function of their own algorithm, include the use of additional fields within the cache line.

Another embodiment of the present invention provides a computer program product for managing a direct-mapped cache, the computer program product comprising a computer readable storage medium having non-transitory program instructions embodied therewith, wherein the non-transitory program instructions are executable by a processor to cause the processor to perform a method. The method comprises a direct-mapped cache receiving a series of memory references indexed to a cache line of the direct-mapped cache, using a first cache line replacement algorithm to select a main memory block as a candidate for storage in the cache line of the direct-mapped cache in response to each memory reference, and using a second cache line replacement algorithm to select a main memory block as a candidate for storage in the cache line of the direct-mapped cache in response to each memory reference. The method further comprises identifying, over a plurality of most recently received memory references, which one of the first and second cache line replacement algorithms has selected a main memory block that matches a next memory reference a greater number of times, and storing a block of main memory in the cache line, wherein the block of main memory stored in the cache line is the main memory block selected by the identified cache line replacement algorithm.

The foregoing computer program products may further include program instructions for implementing or initiating any one or more aspects of the methods described herein. Accordingly, a separate description of the methods will not be duplicated in the context of a computer program product.

Figure 3:
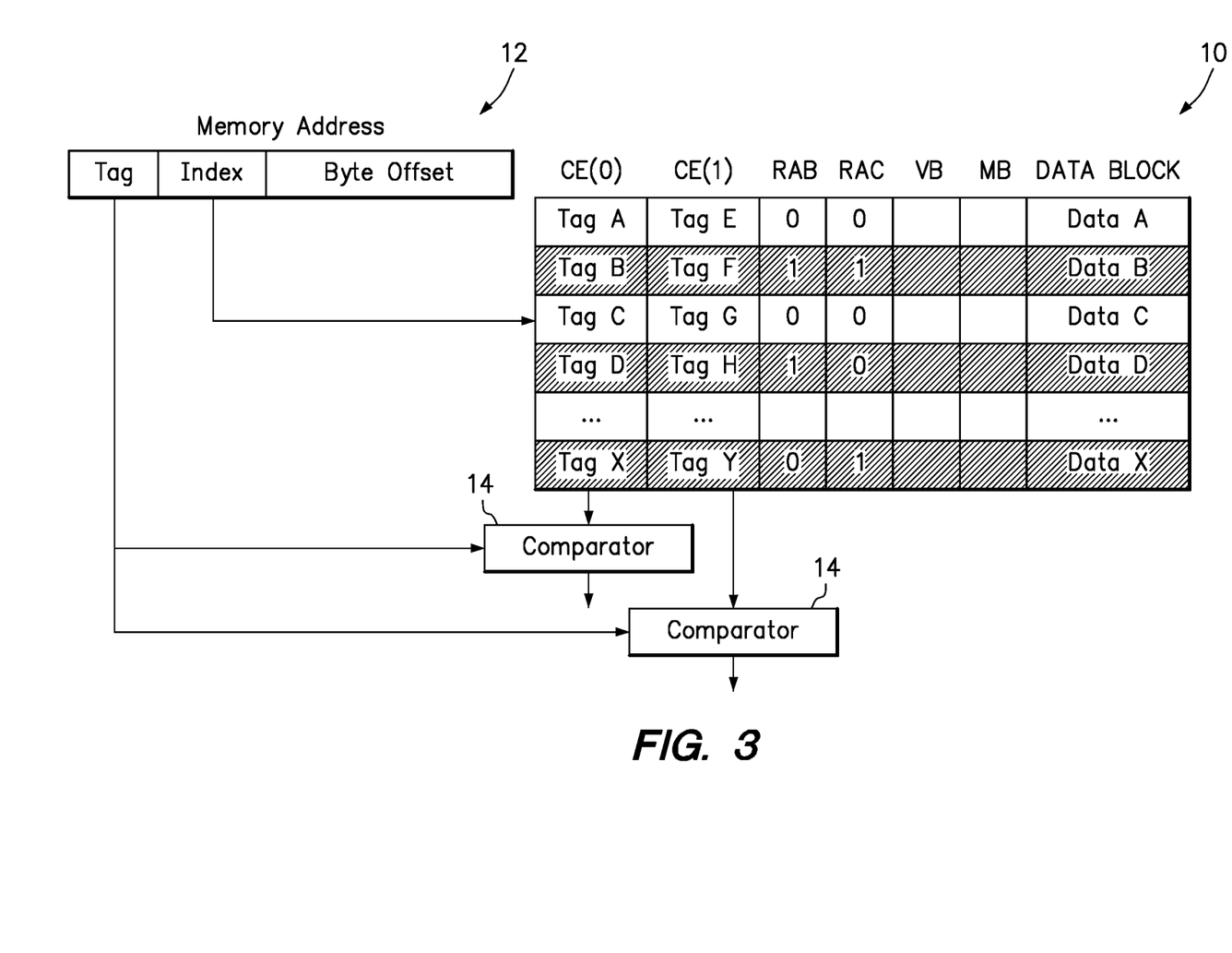
FIG. 3 is a diagram of an alternative direct-mapped cache according to one embodiment of the present invention.

FIG. 3 is a diagram of a direct-mapped cache 10 according to one embodiment of the present invention. The direct-mapped cache 10 is illustrated as being divided into rows, but the direct-mapped cache may be stored in any manner. The direct-mapped cache includes a plurality of cache lines, where each "cache line" is a record having any number of fields for storing data, regardless of how that data is organized on a data storage medium that forms the cache.

As previously described, each cache line of the direct-mapped cache is mapped to a plurality of main memory blocks having the same index. However, each cache line of the cache 10 according to one embodiment of the present invention includes a first current entry field (CE(0)), a second current entry field (CE(1)), a cache line replacement algorithm bit field (RAB), a replacement algorithm count field (RAC), and a data block. As previously described, the first current entry field (CE(0)) may store a tag of a candidate main memory block selected by a first cache line replacement algorithm. Similarly, the second current entry field (CE(1)) may store a tag of a candidate main memory block selected by a second cache line replacement algorithm. The cache line replacement algorithm bit field (RAB) may store a binary value that identifies, or points to, the current entry field of the identified (active) cache line replacement algorithm. The replacement algorithm count field (RAC) is used to track, over a plurality of most recently received memory references, the relative performance of the first and second cache line replacement algorithms. More specifically, the replacement algorithm count field (RAC) may identify, over a plurality of most recently received memory references, a number of times that the identified cache line replacement algorithm has selected a main memory block that matches a next memory reference and the cache line replacement algorithm that is not the identified cache line replacement algorithm has selected a main memory block that does not match the next memory reference, less a number of times that the cache line replacement algorithm that is not the identified cache line replacement algorithm has selected a main memory block that matches a next memory reference and the identified cache line replacement algorithm has selected a main memory block that does not match the next memory reference. The data block stores a block of main memory having a main memory address described by the combination of the tag stored in the current entry field identified by the replacement algorithm bit field and the index associated with the particular cache line.

Furthermore, each cache line may further include a validity bit field (VB) and a modified bit field (MB) for use in a conventional manner, such that the validity bit identifies whether the data in the data block is valid and the modified bit (or dirty bit) identifies whether the data in the data block has be modified. If a data block has been modified, the data needs to be written back to storage before the data is replaced.

When a memory reference 12 is received by the direct-mapped cache 10, an index portion of the memory reference 12 identifies which line of the cache 10 is mapped to the memory reference, and a tag portion of the memory reference 12 is compared to the tag stored in the first current entry field (CE(0)) of the identified cache line and the second current entry field (CE(1)) of the identified cache line. If the tag of the memory reference matches the tag of the current entry field of the identified (active) cache line replacement algorithm, then there is a cache hit and the data block stored in the cache line may be used in an associated read or write option. However, if the tag of the memory reference does not match the tag of the current entry field of the identified (active) cache line replacement algorithm, then there is a cache miss and the read or write operation accompanying the memory address reference 12 may include an immediate access of main memory.

However, in accordance with embodiments of the present invention, the tag of the memory reference 12 is also compared with the tag stored in the current entry field of the (inactive) cache line replacement algorithm that is not the identified (active) cache line replacement algorithm. The results of the two comparisons (i.e., the output of the two comparators 14) are used to determine whether or not to change the value of the replacement algorithm bit (RAB) field or the replacement algorithm count (RAC) field, and if so, how to change the value of the replacement algorithm bit (RAB) field or the replacement algorithm count (RAC) field. Ultimately, the RAB and RAC fields are used to dynamically determine which one of the first and second cache line replacement algorithms will be used to select the main memory block that will be stored in the cache line. A process for updating the RAB and RAC fields in response to a next received memory reference is described in detail in reference to FIG. 6.

Figure 4:
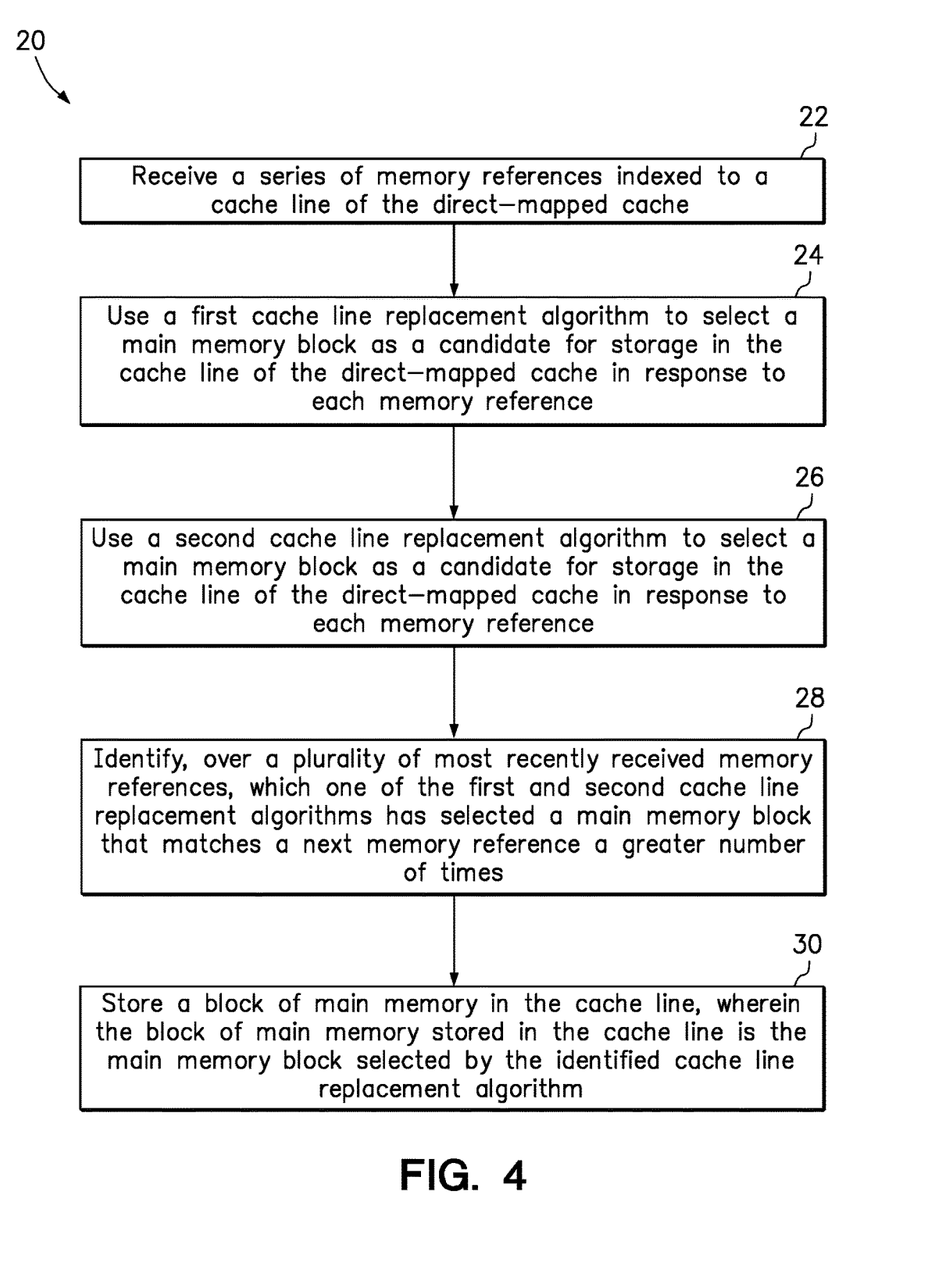
FIG. 4 is a flowchart of a method according to an embodiment of the present invention.

FIG. 4 is a flowchart of a method 20 according to an embodiment of the present invention. In step 22, a direct-mapped cache receives a series of memory references indexed to a cache line of the direct-mapped cache. In step 24, the method uses a first cache line replacement algorithm to select a main memory block as a candidate for storage in the cache line of the direct-mapped cache in response to each memory reference. In step 26, the method uses a second cache line replacement algorithm to select a main memory block as a candidate for storage in the cache line of the direct-mapped cache in response to each memory reference. The first and second cache line replacement algorithms may select the same or different candidate main memory blocks. In step 28, the method identifies, over a plurality of most recently received memory references, which one of the first and second cache line replacement algorithms has selected a main memory block that matches a next memory reference a greater number of times. In step 30, the method stores a block of main memory in the cache line, wherein the block of main memory stored in the cache line is the main memory block selected by the identified cache line replacement algorithm.

Figure 5:
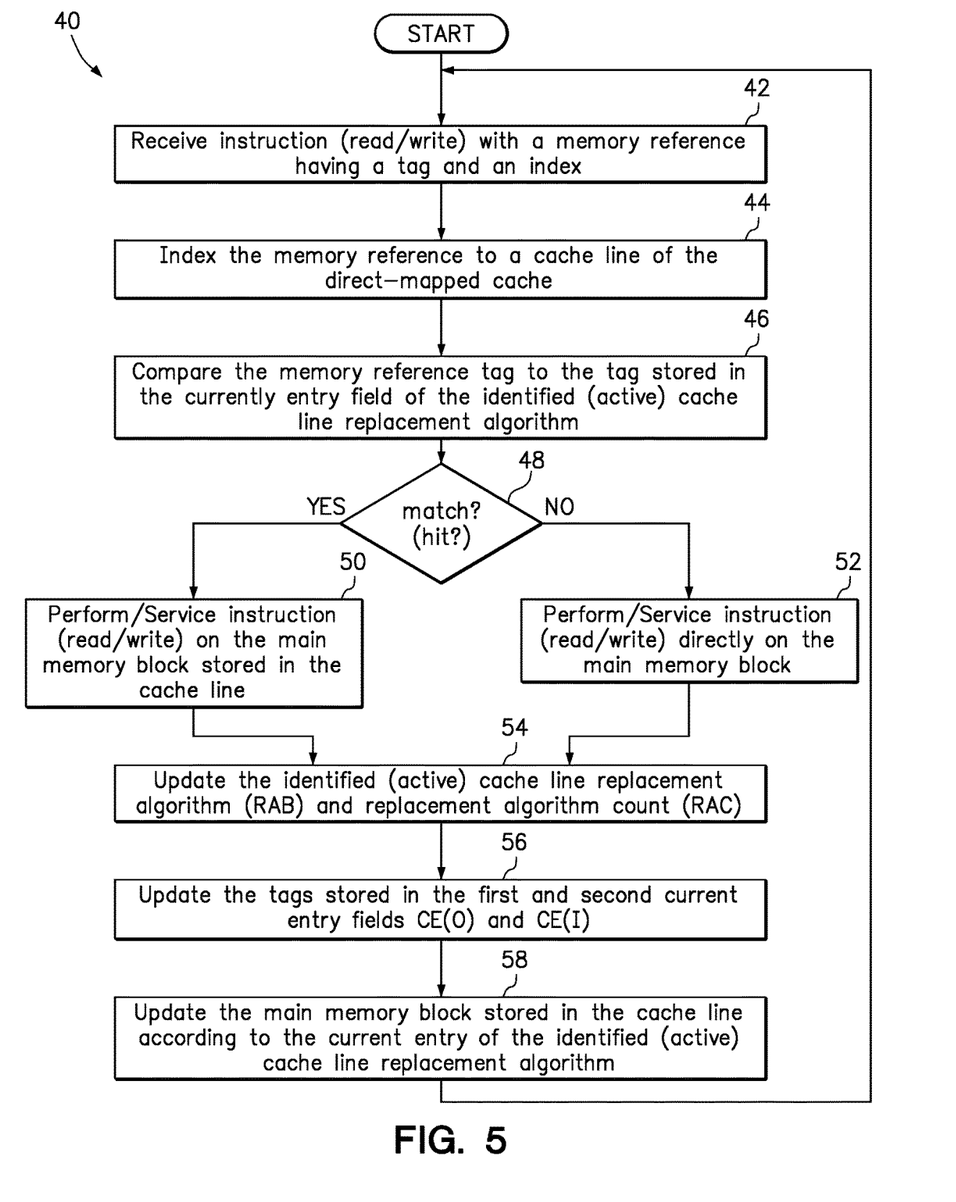
FIG. 5 is a flowchart of a method according to another embodiment of the present invention.

FIG. 5 is a flowchart of a method 40 according to another embodiment of the present invention. In step 42, a direct-mapped cache receives an instruction, such as a read or write instruction, with a memory reference having a tag portion and an index portion. In step 44, the memory reference is indexed to a particular cache line of the direct-mapped cache. Then, in step 46, the method compares the memory reference tag to the tag stored in the current entry field of the identified (active) cache line replacement algorithm.

In step 48, the method determines whether or not the memory reference tag matches the tag stored in the current entry field of the identified (active) cache line replacement algorithm. If the tags match, then step 50 performs or services the read or write instruction on the main memory block stored in the cache line. However, if the tags do not match, then step 52 performs or services the read or write instruction on the main memory block stored in the main memory.

In step 54, the method updates the identified (active) cache line replacement algorithm (RAB) and replacement algorithm count (RAC). One embodiment of step 54 is described in detail in reference to FIG. 6. In step 56, the method updates the tags stored in the first and second current entry fields CE(0) and CE (1) according to the first and second cache line replacement algorithms, respectively. In step 58, the method will, if the tag of the identified cache line replacement algorithm has changed, update the main memory block stored in the cache line according to the current entry of the identified (active) cache line replacement algorithm. The method may then repeat, returning to step 42 when a next instruction with a memory reference is received.

Figure 6:
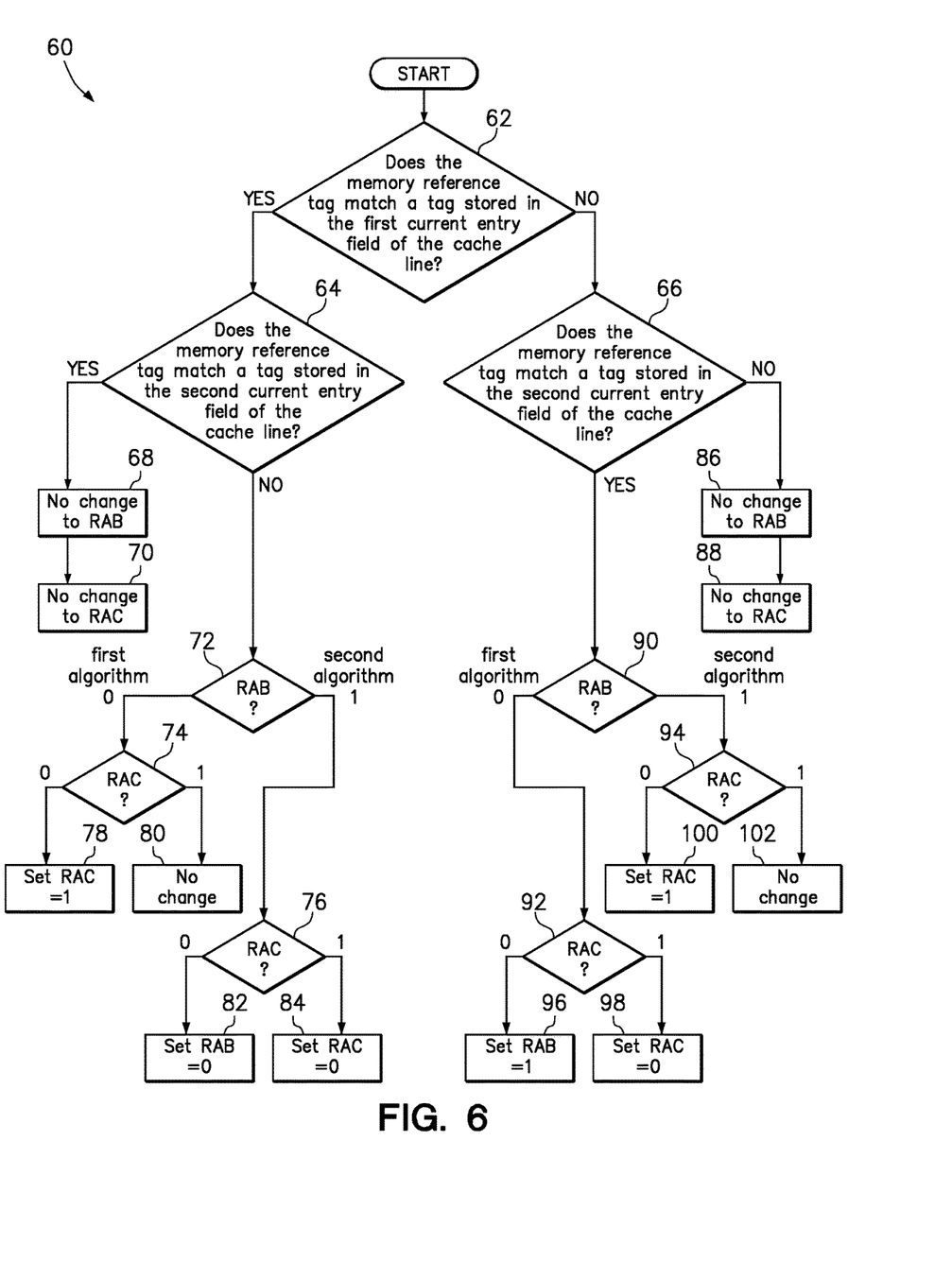
FIG. 6 is a flowchart of a method according to yet another embodiment of the present invention.

FIG. 6 is a flowchart of a method 60 according to one embodiment of the present invention. For example, the method 60 is one embodiment for implementing step 56 of FIG. 5. In step 62, the method determines whether the memory reference tag matches a tag stored in the first current entry field of the cache line. From step 62, the method branches into a "YES" branch (matches) to step 64 and a "NO" branch (does not match) to step 66. However, both step 64 and step 66 determine whether the memory reference tag matches a tag stored in the second current entry field of the cache line, and both step 64 and step 66 branch into their own respective "YES" branch (matches) and "NO" branch (does not match).

If the memory reference tag matches a tag stored in the first current entry field per step 62 and matches a tag stored in the second current entry field per step 64, then step 68 makes no change to the RAB and step 70 makes no change to the RAC. Essentially, the two cache line replacement algorithms both produced a match such that neither algorithm performed better than the other.

If the memory reference tag matches a tag stored in the first current entry field per step 62 and does not match a tag stored in the second current entry field per step 64, then the method advances to step 72 to determine the current RAB and steps 74 and 76 to determine the current RAC.

If the current RAB is "0" (i.e., the first cache line replacement algorithm is the identified "active" cache line replacement algorithm) and the RAC is "0", then the RAC is set equal to "1" in step 78. Since the first cache line replacement algorithm produces a match while the second cache line replacement algorithm did not produce a match, and since the first cache line replacement algorithm is already the active algorithm (RAB=1), the RAC is changed from "0" to "1" so that the first cache line replacement algorithm is not subject to immediate replacement as the active algorithm unless the second algorithm does better than the first algorithm at least two times.

If the current RAB is "0" (i.e., the first cache line replacement algorithm is the identified "active" cache line replacement algorithm) and the RAC is already "1", then neither the RAB nor the RAC is changed in step 80 since the first algorithm continues to perform better than the second algorithm.

If the current RAB is "1" (i.e., the second cache line replacement algorithm is the identified "active" cache line replacement algorithm) and the RAC is "0", then the RAB is set equal to "0" in step 82 to effect a change in the identified (active) cache line replacement algorithm. The RAC may remain at "0" to indicate that the identified (active) cache line replacement algorithm is subject to immediate change if outperformed by the other algorithm.

If the current RAB is "1" (i.e., the second cache line replacement algorithm is the identified "active" cache line replacement algorithm) and the RAC is "1", then the RAC is set equal to "0" in step 84. Since the second algorithm is the identified (active) cache line replacement algorithm (RAB=1) and had previously outperformed the first algorithm at least twice over the recently received memory references (RAC=1), the RAC is changed to "0" since the first algorithm just performed better on the most recently received memory reference. Should the first algorithm perform better than the second algorithm in response to receiving the next memory reference, then the first algorithm may become the identified (active) cache line replacement algorithm.

If the memory reference tag does not matches a tag stored in the first current entry field per step 62 and also does not match a tag stored in the second current entry field per step 66, then step 86 makes no change to the RAB and step 88 makes no change to the RAC. Essentially, the two cache line replacement algorithms both failed to produce a match such that neither algorithm performed better than the other.

If the memory reference tag does not matches a tag stored in the first current entry field per step 62 and matches a tag stored in the second current entry field per step 66 (i.e., the second algorithm out performs the first algorithm), then the method advances to step 90 to determine the current RAB and steps 92 and 94 to determine the current RAC.

If the current RAB is "0" (i.e., the first cache line replacement algorithm is the identified "active" cache line replacement algorithm) per step 90 and the RAC is "0" per step 92, then the RAB is set equal to "1" in step 96 to effect a change in the identified (active) cache line replacement algorithm from the first algorithm to the second algorithm. The RAC may remain at "0" to indicate that the identified (active) cache line replacement algorithm is subject to immediate change if outperformed by the other algorithm.

If the current RAB is "0" (i.e., the first cache line replacement algorithm is the identified "active" cache line replacement algorithm) and the RAC is "1", then the RAC is set equal to "0" in step 98. Since the first algorithm is the identified (active) cache line replacement algorithm (RAB=0) and had previously outperformed the second algorithm at least twice over the recently received memory references (RAC=1), the RAC is changed to "0" since the second algorithm just performed better than the first algorithm on the most recently received memory reference. Should the second algorithm perform better than the first algorithm in response to receiving the next memory reference, then the second algorithm may become the identified (active) cache line replacement algorithm.

If the current RAB is "1" (i.e., the second cache line replacement algorithm is the identified "active" cache line replacement algorithm) and the RAC is "0", then the RAC is set equal to "1" in step 100. Since the first cache line replacement algorithm did not produce a match per step 62 while the second cache line replacement algorithm did produce a match per step 66, and since the second cache line replacement algorithm is already the active algorithm (RAB=1), the RAC is changed from "0" to "1" so that the second cache line replacement algorithm is not subject to immediate replacement as the active algorithm unless the first algorithm does better than the second algorithm at least two times.

If the current RAB is "1" (i.e., the second cache line replacement algorithm is the identified "active" cache line replacement algorithm) and the RAC is already "1", then neither the RAB nor the RAC is changed in step 102 since the second algorithm continues to perform better than the first algorithm.

Table 1, below, summarizes the logic of method 60. In Table 1, Algorithm A is the first cache line replacement algorithm, Algorithm B is the second cache line replacement algorithm, and the current RAB is identified as either "A" (corresponding to an RAB of "0" in method 60) or "B" (corresponding to an RAB of "1" in method 60).

TABLE 1

Example Logic Table

| Algorithm A | Algorithm B | Current RAB | Current RAC | Next RAB | Next RAC | Data |
|---|---|---|---|---|---|---|
| No Match | No Match | A or B | 0 or 1 | No Change | No Change | Updated |
| Match | Match | A or B | 0 or 1 | No Change | No Change | Unchanged |
| Match | No Match | A | 0 or 1 | A | 1 | Unchanged |
| Match | No Match | B | 0 | A | 0 | Updated |
| Match | No Match | B | 1 | B | 0 | Updated |
| No Match | Match | A | 0 | B | 0 | Updated |
| No Match | Match | A | 1 | A | 0 | Updated |
| No Match | Match | B | 0 or 1 | B | 1 | Unchanged |

The methods represented by FIGS. 4-6 were implemented in a computer simulation using a first cache replacement algorithm, Algorithm A (a conventional cache line replacement algorithm as represented by FIG. 2), and a second cache line replacement algorithm, Algorithm B (the cache line replacement algorithm of copending U.S. patent application Ser. No. 15/086,989 filed on Mar. 31, 2016, which application is incorporated by reference herein). The miss rates for the direct-mapped cache were measured for three scenarios: (1) using only Algorithm A, (2) using only Algorithm B, and (3) using the adaptive combination of Algorithm A and Algorithm B in accordance with embodiments of the present invention. The results of this comparison are set out below in Table 2.

TABLE 2

Performance Comparisons (Miss Rates)

|  | Workload 1 | Workload 2 |
|---|---|---|
| Algorithm A | 4.75% | 21.92% |
| Algorithm B | 7.21% | 19.23% |
| Adaptive Algorithm | 4.70% | 19.15% |

The conventional Algorithm A replaces the data block of the cache line with the main memory block associated with the most recently received memory reference any time there is a cache miss. The alternative Algorithm B retains a data block in a cache line if that data block has been referenced multiple consecutive times, and does not replace the data block until another memory reference that maps to the same cache location has been received multiple times. Existing direct-mapped cache designs only use a single cache line replacement algorithm and do not have the ability to switch between two algorithms.

As shown in the table, Algorithm A produces a miss rate that is lower than Algorithm B for Workload 1, but Algorithm B produces a miss rate that is lower than Algorithm A for Workload 2. This is due to a difference in memory reference patterns of the two workloads. However, the adaptive algorithm of the present invention, switches between Algorithm A and Algorithm B to always use the algorithm that is performing better over a plurality of most recently received memory references. This adaptive method has been shown to produce a lower cache miss rate (better cache hit rate) than either of the fixed algorithms alone.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   a direct-mapped cache receiving a series of memory references indexed to a cache line of the direct-mapped cache;
   using, in response to each memory reference in the series of memory references, a first cache line replacement algorithm and a second cache line replacement algorithm, wherein the first cache line replacement algorithm uses each memory reference to select a main memory block as a candidate for storage in the cache line of the direct-mapped cache; and wherein the second cache line replacement algorithm uses each memory reference to select a main memory block as a candidate for storage in the cache line of the direct-mapped cache;
   identifying, over a plurality of most recently received memory references, which one of the first cache line replacement algorithm and the second cache line replacement algorithm has selected a main memory block that matches a next memory reference of the plurality of most recently received memory references a greater number of times; and
   storing a block of main memory in the cache line, wherein the block of main memory stored in the cache line is the main memory block selected by the identified cache line replacement algorithm.

2. The method of claim 1, further comprising:
   storing a first tag in a first current entry field of the cache line, wherein the first tag identifies the block of main memory selected by the first cache line replacement algorithm in response to the most recently received memory reference; and
   storing a second tag in a second current entry field of the cache line, wherein the second tag identifies the block of main memory selected by the second cache line replacement algorithm in response to the most recently received memory reference.

3. The method of claim 2, further comprising:
   determining whether the next memory reference received has a tag that matches the tag stored in the first current entry field of the cache line; and
   determining whether the next memory reference received has a tag that matches the tag stored in the second current entry field of the cache line.

4. The method of claim 1, further comprising:
   storing a value in a replacement algorithm bit field in the cache line to indicate the identified cache line replacement algorithm, wherein a first value stored in the replacement algorithm bit field indicates that the first cache line replacement algorithm is currently being used to select the main memory block stored in the cache line, and wherein a second value stored in the replacement algorithm bit field indicates that the second cache line replacement algorithm is currently being used to select the main memory block stored in the cache line.

5. The method of claim 4, further comprising:
   storing a value in a replacement algorithm count field of the cache line of the direct-mapped cache to indicate, over the plurality of most recently received memory references, a number of times that the identified cache line replacement algorithm has selected a main memory block that matches a next memory reference and the cache line replacement algorithm that is not the identified cache line replacement algorithm has selected a main memory block that does not match the next memory reference, less a number of times that the cache line replacement algorithm that is not the identified cache line replacement algorithm has selected a main memory block that matches a next memory reference and the identified cache line replacement algorithm has selected a main memory block that does not match the next memory reference.

6. The method of claim 5, wherein a first value stored in the replacement algorithm count field indicates that the cache line replacement algorithm that is not currently the identified cache line replacement algorithm will become the identified cache line replacement algorithm in response to a next received memory reference matching the main memory block selected by the cache line replacement algorithm that is not currently the identified cache line replacement algorithm and not matching the main memory block selected by the identified cache line replacement algorithm.

7. The method of claim 6, further comprising:
   switching the one of the first cache line replacement algorithm and the second cache line replacement algorithm that is currently the identified cache line replacement algorithm in response to a next received memory reference matching the main memory block selected by the cache line replacement algorithm that is not currently the identified cache line replacement algorithm and not matching the main memory block selected by the identified cache line replacement algorithm when the replacement algorithm count field stores the first value.

8. The method of claim 7, wherein switching the one of the first cache line replacement algorithm and the second cache line replacement algorithm that is currently the identified cache line replacement algorithm, includes changing the value stored in the replacement algorithm bit field.

9. The method of claim 6, wherein a next received memory reference matches a main memory block if the next received memory reference has a tag that matches a tag associated with the main memory block.

10. The method of claim 6, wherein a second value stored in the replacement algorithm count field indicates that the second value will be changed to the first value in response to the next received memory reference matching the main memory block selected by the cache line replacement algorithm that is not currently the identified cache line replacement algorithm and not matching the main memory block selected by the identified cache line replacement algorithm.

11. The method of claim 10, further comprising:
    changing the replacement algorithm count bit from the second value to the first value in response to the next received memory reference matching the main memory block selected by the cache line replacement algorithm that is not currently the identified cache line replacement algorithm and not matching the main memory block selected by the identified cache line replacement algorithm.

12. The method of claim 10, further comprising:
    changing the replacement algorithm count bit from the first value to the second value in response to the next received memory reference matching the main memory block selected by the identified cache line replacement algorithm and not matching the main memory block selected by the cache line replacement algorithm that is not currently the identified cache line replacement algorithm.

13. The method of claim 5, further comprising:
maintaining the values stored in the replacement algorithm field and the replacement algorithm count field in response to determining that the most recently received memory reference matches the main memory block selected by the identified cache line replacement algorithm and matches the main memory block selected by the cache line replacement algorithm that is not currently the identified cache line replacement algorithm.

14. The method of claim 5, further comprising:
maintaining the values stored in the replacement algorithm field and the replacement algorithm count field in response to determining that the most recently received memory reference does not match the main memory block selected by the identified cache line replacement algorithm and does not match the main memory block selected by the cache line replacement algorithm that is not currently the identified cache line replacement algorithm.

15. The method of claim 1, wherein each memory reference includes an index portion that identifies the cache line being addressed and a tag portion that identifies one of a plurality of main memory blocks mapped to the cache line.

16. The method of claim 1, further comprising:
performing a read operation on the main memory block stored in the cache line in response to the direct-mapped cache receiving a read instruction with a memory reference having a tag that matches the tag stored in the current entry field of the identified cache line replacement algorithm.

17. The method of claim 1, further comprising:
performing a write operation on the main memory block stored in the cache line in response to the direct-mapped cache receiving a write instruction with a memory reference having a tag that matches the tag stored in the current entry field of the identified cache line replacement algorithm.

18. A computer program product for managing a direct-mapped cache, the computer program product comprising a computer readable storage medium having non-transitory program instructions embodied therewith, the non-transitory program instructions executable by a processor to cause the processor to perform a method comprising:

receiving a series of memory references indexed to a cache line of the direct-mapped cache;
using, in response to each memory reference in the series of memory references, a first cache line replacement algorithm, wherein the first cache line replacement algorithm uses each memory reference to select a main memory block as a candidate for storage in the cache line of the direct-mapped cache;
using, in response to each memory reference in the series of memory reference, a second cache line replacement algorithm, wherein the second cache line replacement algorithm uses each memory reference to select a main memory block as a candidate for storage in the cache line of the direct-mapped cache;
identifying, over a plurality of most recently received memory references, which one of the first cache line replacement algorithm and the second cache line replacement algorithm has selected a main memory block that matches a next memory reference of the plurality of most recently received memory references a greater number of times; and
storing a block of main memory in the cache line, wherein the block of main memory stored in the cache line is the main memory block selected by the identified cache line replacement algorithm.

19. The computer program product of claim 18, the method further comprising:
storing a first tag in a first current entry field of the cache line, wherein the first tag identifies the block of main memory selected by the first cache line replacement algorithm in response to the most recently received memory reference; and
storing a second tag in a second current entry field of the cache line, wherein the second tag identifies the block of main memory selected by the second cache line replacement algorithm in response to the most recently received memory reference.

20. The computer program product of claim 19, the method further comprising;
determining whether the next memory reference received has a tag that matches the tag stored in the first current entry field of the cache line; and
determining whether the next memory reference received has a tag that matches the tag stored in the second current entry field of the cache line.

\* \* \* \* \*